United States Patent
Yasmin et al.

(10) Patent No.: US 11,588,622 B2
(45) Date of Patent: Feb. 21, 2023

(54) SECURING OUTSIDE-VEHICLE COMMUNICATION USING IBC

(71) Applicant: Huawei International Pte. Ltd., Singapore (SG)

(72) Inventors: Rehana Yasmin, Singapore (SG); Zhuo Wei, Singapore (SG); Fei Hua, Shanghai (CN); Yanjiang Yang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 391 days.

(21) Appl. No.: 16/833,022

(22) Filed: Mar. 27, 2020

(65) Prior Publication Data

US 2020/0228326 A1    Jul. 16, 2020

Related U.S. Application Data

(63) Continuation of application No. PCT/SG2017/050488, filed on Sep. 29, 2017.

(51) Int. Cl.
| | |
|---|---|
| *H04L 9/08* | (2006.01) |
| *H04L 9/32* | (2006.01) |
| *H04W 12/033* | (2021.01) |
| *H04W 12/037* | (2021.01) |

(52) U.S. Cl.
CPC .......... *H04L 9/0819* (2013.01); *H04L 9/0866* (2013.01); *H04L 9/3242* (2013.01);
(Continued)

(58) Field of Classification Search
CPC .... H04L 9/0819; H04L 9/0866; H04L 9/3242
See application file for complete search history.

(56) References Cited

U.S. PATENT DOCUMENTS

| | | |
|---|---|---|
| 9,021,256 B2 | 4/2015 | Zhang et al. |
| 9,032,493 B2 | 5/2015 | Lortz et al. |
| 9,094,206 B2 | 7/2015 | Di Crescenzo et al. |
| 9,268,545 B2 | 2/2016 | Lortz et al. |

(Continued)

FOREIGN PATENT DOCUMENTS

| | | |
|---|---|---|
| CN | 106131059 A | 11/2016 |
| CN | 106209777 A | 12/2016 |

(Continued)

OTHER PUBLICATIONS

Kamat et al.,"An Identity-Based Security Framework for VANETs," VANET '06, Proceedings of the International Workshop on Vehicular Ad Hoc Networks, Los Angeles, California, USA, pp. 94-95, (Sep. 29, 2006).

(Continued)

*Primary Examiner* — Ponnoreay Pich
(74) *Attorney, Agent, or Firm* — Leydig, Voit & Mayer, Ltd.

(57) ABSTRACT

A vehicle communication access framework and a method are provided. The vehicle communication access framework comprises: a first device residing in a vehicle, a first processing system operated by a trusted third party, a second processing system operated by an original equipment manufacturer (OEM) of the vehicle, and a third processing system operated by a third party provider; wherein communication accesses among the first device, second processing system and third processing system are based on Identity Based Cryptography (IBC) private keys generated by the first processing system to respective first device, second processing system and third processing system.

20 Claims, 7 Drawing Sheets

(52) U.S. Cl.
CPC ....... *H04W 12/033* (2021.01); *H04W 12/037* (2021.01); *H04L 2209/84* (2013.01)

(56) References Cited

U.S. PATENT DOCUMENTS

| | | |
|---|---|---|
| 2002/0023223 A1 | 2/2002 | Schmidt et al. |
| 2009/0225986 A1 | 9/2009 | Gennaro et al. |
| 2010/0031042 A1* | 2/2010 | Di Crescenzo ........... H04L 9/32 713/168 |
| 2010/0318812 A1 | 12/2010 | Auradkar et al. |
| 2013/0212377 A1 | 8/2013 | Malek |
| 2014/0229736 A1* | 8/2014 | Asim .................... H04L 9/0847 713/171 |
| 2016/0065362 A1 | 3/2016 | Choyi et al. |
| 2017/0104589 A1 | 4/2017 | Lambert et al. |
| 2020/0228326 A1* | 7/2020 | Yasmin ................ H04L 9/3242 |
| 2021/0119800 A1* | 4/2021 | Jung .................... H04L 9/3242 |
| 2022/0191006 A1* | 6/2022 | Zeh ...................... H04L 9/3242 |

FOREIGN PATENT DOCUMENTS

| | | |
|---|---|---|
| CN | 106330910 A | 1/2017 |
| CN | 107071774 A | 8/2017 |
| EP | 1127756 B1 | 4/2005 |
| EP | 1530339 B1 | 3/2008 |

OTHER PUBLICATIONS

Hieu et al., "Proposal of inter-vehicle authentication method using ID-based encryption," A-17-2, Proceedings of the 2014 IEICE Engineering Sciences Society Conference, Japan, The Institute of Electronics, Information and Communication Engineers, Total 6 pages (Sep. 2014). With an English Translation.

Sun et al., "An Identity-Based Security System for User Privacy in Vehicular Ad Hoc Networks," IEEE Transactions on Parallel and Distributed Systems, vol. 21, No. 9, pp. 1227-1239, Institute of Electrical and Electronics Engineers, New York, New York (Sep. 2010).

"Connected Vehicle Platform Security Vehicle as a Mobile Computing Device," covisint a Compuware Company, pp. 1-13 (May 2017).

Kamat et al., "Secure, pseudonymous, and auditable communication in vehicular ad hoc networks," Security and Communication Networks, vol. 1, No. 3, pp. 233-244 (Jun. 2008).

Timpner et al., "Secure Smartphone-based Registration and Key Deployment for Vehicle-to-Cloud Communications," CyCar '13: Proceedings of the 2013 ACM Workshop on Security, Privacy & Dependability for Cyber Vehicles, Total 6 pages, Berlin, Germany (Nov. 2013).

Leinmüller et al., "SEVECOM—Secure Vehicle Communication," IST Mobile and Wireless Communication Summit, pp. 1-5 (Jun. 2006).

Han et al., "Short Paper: MVSec: Secure and Easy-to-use Pairing of Mobile Devices with Vehicles," WiSec '14 Proceedings of the 2014 ACM Conference on Security and Privacy in Wireless Mobile Networks, Total 6 pages, Oxford, UK (2014).

SHAMIR "Identity-Based Cryptosystems and Signature Schemes," Advances in Cryptology, CRYPTO 1984, Lecture Notes in Computer Science, vol. 196, pp. 47-53, Springer, Berlin, Heidelberg (1985).

* cited by examiner

SECURING OUTSIDE-VEHICLE COMMUNICATION USING IBC

CROSS-REFERENCE TO RELATED APPLICATIONS

This application is a continuation of International Application No. PCT/SG2017/050488, filed on Sep. 29, 2017. The disclosure of the aforementioned application is hereby incorporated by reference in its entirety.

FIELD OF THE APPLICATION

Embodiments of this disclosure relate to a vehicle communication access framework. Particularly, embodiments of this disclosure relate to a method and system for generating and distributing Identity Based Cryptography (IBC) keys to vehicles and other entities such that the vehicles are able to communicate with other entities.

BACKGROUND

As shown in FIG. 1, a future vehicle 110 is a connected car indulging in communication with several external entities such as other vehicles 111, automaker's cloud 120, mobile devices (e.g., smartphone, laptop, PDA etc.) belonging to vehicle owner 130, infrastructure 140, pedestrians 150 and third party clouds 160 forming vehicle-to-everything (V2X) communication 100. Several features are packaged in a connected car such as driver assistance, remote car control, Internet connectivity, external device connectivity, infotainment etc., with the participation of above entities. Most of the car communication is a two-way wireless communication using either short range or long range communication medium. Currently, several communication technologies have become an integral part of modern cars such as long range GPS, GSM, 3G, 4G etc., and short range Wi-Fi, Bluetooth, RFID, NFC, DSRC, etc.

Communication between vehicle, automaker's cloud and mobile devices is usually operation-related communication which takes place to perform operations such as to take control of or obtain information from the car. The mobile device could be in direct communication range of the vehicle using any short range communication medium or it can remotely contact the vehicle via a service provided by automaker's cloud using a long range communication medium. Communication between vehicle and all other entities constitutes service-related communication to implement services such as road safety, on-the-road-information, value added services and infotainment.

The connected cars' data is private and confidential and should not be accessible to the outside world. Security is a major concern in car communication since wireless communication opens the door for several remote attacks. Any wireless-enabled device eavesdropping on the broadcast wireless communication as well as pretending to be a legitimate entity can add spoofed communication. Strong Authentication and Confidentiality mechanisms are required to thwart identity spoofing attack and eavesdropping attack respectively. Authentication can be implemented via Message Authentication Code (MAC) using symmetric key based cryptography or via secure signature schemes using Public Key Cryptography (PKC). Eavesdropping on the other hand can be avoided by implementing Encryption schemes.

Existing approaches either use symmetric key based or traditional certificate based PKC based solutions. They both have their own problems when utilized in V2X communication.

In symmetric key cryptography, both communicating parties share a copy of the same private key. A single private key is used on both sides to compute and verify a MAC for authentication or to encrypt/decrypt data for confidentiality. Symmetric key system suffers from the problems of 1) how to securely distribute private shared key to each entity involved in communication, and 2) compromise/misuse of the private key by an intruder where several entities have a copy of the same key. Symmetric key based solutions do not suit V2X environment where a large number of random entities are involved in communication needing same private key. Furthermore, trusting each entity in such a heterogeneous environment is not practical. Hence, symmetric key is not a suitable solution for V2X communication.

In traditional certificate based PKC system, a related pair of keys is generated for a user. User keeps one key for private use and makes other key public. Private key can then be used either to decrypt a document that has been encrypted using the corresponding public key, or to sign a message which can be verified with the corresponding public key. The public key is bounded to the user by mean of a certificate obtained from CA (certification authority), a TTP (trusted third party), who ensures the correct key is bound to the certificate and signs the certificate using its own private key to ensure the authenticity of the certificate's contents. The PKI (Public Key Infrastructure) is the infrastructure that handles the management of keys and certificates (distribution and identification of public keys and certificates).

Traditional certificate based PKC based solutions suffer from the problem of complex PKI system. One must have other entities certificate to establish a secure channel. Moreover, they are time and resource consuming requiring at least one signature verification to verify the signed certificate before the public key can be used for authentication or decryption. Hence, PKI should be avoided wherever possible.

Real time services of vehicles such as collision avoidance system, traffic management system etc., need speedy security. Certificate verification time may be crucial for time critical collision avoidance system. Signature generation and verification should also be efficient in terms of time consumption in order to avoid fatal accidents. Moreover, managing digital certificates and their associated keys is complex in dynamic communication network of connected cars.

Hence, those skilled in the art are striving to provide a method of establishing communication between the vehicle and other systems in a quick and efficient manner.

SUMMARY OF THE APPLICATION

The above and other problems are solved and an advance in the state of art is made by systems and methods provided by embodiments in accordance with the disclosure. A first advantage of embodiments of systems and methods in accordance with the disclosure is that private key is generated by a PKG (Private Key Generator), which is a TTP, and there is no certificate required to validate the authenticity of the public key, i.e., ID. A second advantage of embodiments of systems and methods in accordance with the disclosure is that systems and methods can be implemented to existing framework without additional hardware. It is noted that some public services inside open environment may use both IBC and PKI schemes and third party services may use their own solutions. Hence, this allows some flexibility for third party services that insist on using current PKI system.

A first aspect of the disclosure relates to a vehicle communication access framework. The framework comprises a first device residing in a vehicle, a first processing system operated by a trusted third party, a second processing system operated by an original equipment manufacturer (OEM) of the vehicle, and a third processing system operated by a third party provider. The communication accesses among the first device, second processing system and third processing system are based on Identity Based Cryptography (IBC) private keys generated by the first processing system to respective first device, second processing system and third processing system. The first processing system is configured to: execute a setup algorithm to generate a master secret key (MSK) and generate global system parameters (GSP); receive a request for an IBC private key from the first device, the request comprising an ID of the first device, IDV; establish a secured communication channel with the first device; generate the IBC private key, IBC-KIDv; and transmit the IBC private key, IBC-KIDv, to the first device via the secured communication channel.

In an embodiment of the first aspect of the disclosure, the step to establish the secured communication channel with the first device comprises the first processing system to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the first aspect of the disclosure, the step to generate the IBC private key IBC-KIDV comprises the first processing system to: execute a KeyGen algorithm to compute the IBC private key (IBC-KIDv) corresponding to IDV where the inputs to the KeyGen algorithm include msk, GSP and IDV, and can be expressed in the following expression, IBC-KIDv=KeyGen(msk, GSP, IDV).

In an embodiment of the first aspect of the disclosure, the framework further comprises the first processing system to: receive a request for an IBC private key from one of the second and third processing systems, the request comprising an ID of the second or third processing system; establish a secured communication channel with respective second or third processing system; generate the IBC private key IBC-KID3P; and transmit the IBC private key IBC-KID3P to respective second or third processing system via the secured communication channel.

In an embodiment of the first aspect of the disclosure, the trusted third party is one of a government agency or the OEM.

In an embodiment of the first aspect of the disclosure, the framework further comprises a fourth processing system operated by another trusted third party configured to generate another IBC private key for the first device residing in the vehicle, wherein communication accesses between the first device and the third processing system are based on the another IBC private keys generated by the fourth processing system.

A second aspect of the disclosure relates to a method specifically for a vehicle communication access framework comprising a first device residing in a vehicle, a first processing system operated by a trusted third party, a second processing system operated by an original equipment manufacturer (OEM) of the vehicle, and a third processing system operated by a third party provider. The communication accesses among the first device, second processing system and third processing system are based on Identity Based Cryptography (IBC) private keys generated by the first processing system to respective first device, second processing system and third processing system. The method comprises the first processing system to execute a setup algorithm to generate master secret key (MSK) and generate global system parameters (GSP); receive a request for a private key from the first device, the request comprising an ID of the first device, IDV; establish a secured communication channel with the first device; generate the IBC private key, IBC-KIDv; and transmit the IBC private key IBC-KIDV to the first device via the secured communication channel.

In an embodiment of the second aspect of the disclosure, the step to establish the secured communication channel with the first device comprises the first processing system to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the second aspect of the disclosure, the credential comprises information or details that are known only to the car owner and the trusted third party. Further, the credential is provided by the first processing system to the first device when the car owner registers the car at an office of the trusted third party.

In an embodiment of the second aspect of the disclosure, the step to generate the private key IBC-KIDv comprises the first processing system to: execute a KeyGen algorithm to compute a private key (IBC-KIDv) corresponding to IDV where the inputs to the KeyGen algorithm include msk, GSP and IDV, and can be expressed in the following expression, IBC-KIDv=KeyGen(msk, GSP, IDV).

In an embodiment of the second aspect of the disclosure, the method further comprises the first processing system to: receive a request for a private key from one of the second and third processing systems, the request comprising an ID of the second or third processing system; establish a secured communication channel with respective second or third processing system; generate the private key IBC-KID3P; and transmit the private key IBC-KID3P to respective second or third processing system via the secured communication channel.

In an embodiment of the second aspect of the disclosure, the trusted third party is one of a government agency or the OEM.

In an embodiment of the second aspect of the disclosure, the method further comprises a fourth processing system operated by another trusted third party configured to generate another IBC private key for the first device residing in the vehicle, wherein communication accesses between the first device and the third processing system are based on the another IBC private keys generated by the fourth processing system.

A third aspect of the disclosure relates a n-levels hierarchical vehicle communication access framework comprising: a first device residing in a vehicle, a plurality of first processing systems operated by a trusted third party, a second processing system operated by an original equipment manufacturer (OEM) of the vehicle, and a third processing system operated by a third party provider. The communication accesses among the first device, second processing system and third processing system are based on Identity Based Cryptography (IBC) private keys generated by one of the plurality of first processing systems to respective first device, second processing system and third processing system. The plurality of first processing systems are arranged between level-0 to level-(n−2) in the n-levels hierarchical vehicle communication access framework and first device, second processing system and third processing system are in the level-(n−1) in the n-levels hierarchical vehicle communication access framework. The level-0 first processing system is configured to: execute a setup algorithm to generate a master secret key (MSK) and generate global system parameters (GSP); each of the level-0 to level-(n−3) first processing systems is configured to: receive a request for an IBC private key from a lower intermediate level first processing system, L+1, the request comprising an ID of the lower intermediate level first processing system, IDj,L+1, wherein L indicates the current level number; generate a next level IBC private key, IBC-KIDj,L+1, in response to receiving the request; and transmit the next level IBC private key, IBC-KIDj,L+1, to the lower intermediate level first processing system; each of the level-(n−2) first processing systems is configured to: receive a request for an IBC private key from the first device, the request comprising an ID of the first device, IDV; establish a secured communication channel with the first device; generate a level-(n−1) IBC private key, IBC-KIDv,n−1; and transmit the level-(n−1) IBC private key, IBC-KIDv,n−1, to the first device via the secured communication channel.

In an embodiment of the third aspect of the disclosure, the step to establish the secured communication channel with the first device comprises each of the level-(n−2) first processing systems to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the third aspect of the disclosure, the step to generate the level-(n−1) IBC private key, IBC-KIDv, n−1 comprises each of the level-(n−2) first processing systems to: execute a KeyGen algorithm to compute the IBC private key (IBC-KIDv) corresponding to IDV where the inputs to the KeyGen algorithm include msk, GSP and IDV, and can be expressed in the following expression, IBC-KIDv=KeyGen(msk, GSP, IDV).

In an embodiment of the third aspect of the disclosure, the framework further comprises each of the level-(n−2) first processing systems to: receive a request for an IBC private key from one of the second and third processing systems, the request comprising an ID of the second or third processing system; establish a secured communication channel with respective second or third processing system; generate a level-(n−1) IBC private key, IBC-KID3P,n−1; and transmit the level-(n−1) IBC private key, IBC-KID3P,n−1, to respective second or third processing system via the secured communication channel.

A fourth aspect of the disclosure relates to a method specifically for a n-levels hierarchical vehicle communication access framework comprising a first device residing in a vehicle, a plurality of first processing systems operated by a trusted third party, a second processing system operated by an original equipment manufacturer (OEM) of the vehicle, and a third processing system operated by a third party provider. The communication accesses among the first device, second processing system and third processing system are based on Identity Based Cryptography (IBC) private keys generated by one of the plurality of first processing systems to respective first device, second processing system and third processing system. The plurality of first processing systems are arranged between level-0 to level-(n−2) in the n-levels hierarchical vehicle communication access framework and first device, second processing system and third processing system are in the level-(n−1) in the n-levels hierarchical vehicle communication access framework. The method comprises: the level-0 first processing system to: execute a setup algorithm to generate a master secret key (MSK) and generate global system parameters (GSP); each of the level-0 to level-(n−3) first processing systems to: receive a request for an IBC private key from a lower intermediate level first processing system, L+1, the request comprising an ID of the lower intermediate level first processing system, IDj,L+1, wherein L indicates the current level number; generate a next level IBC private key, IBC-KIDj,L+1, in response to receiving the request; and transmit the next level IBC private key, IBC-KIDj,L+1, to the lower intermediate level first processing system; each of the level-(n−2) first processing systems to: receive a request for an IBC private key from the first device, the request comprising an ID of the first device, IDV; establish a secured communication channel with the first device; generate a level-(n−1) IBC private key, IBC-KIDv,n−1; and transmit the level-(n−1) IBC private key, IBC-KIDv,n−1, to the first device via the secured communication channel.

In an embodiment of the fourth aspect of the disclosure, the step to establish the secured communication channel with the first device comprises each of the level-(n−2) first processing systems to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the fourth aspect of the disclosure, the credential comprises information or details that are known only to the car owner and the trusted third party. Further, the credential is provided by the first processing system to the first device when the car owner registers the car at an office of the trusted third party.

In an embodiment of the fourth aspect of the disclosure, the step to generate the level-(n−1) IBC private key, IBC- KIDv,n−1 comprises each of the level-(n−2) first processing systems to: execute a KeyGen algorithm to compute the IBC private key (IBC-KIDv) corresponding to IDV where the inputs to the KeyGen algorithm include msk, GSP and IDV, and can be expressed in the following expression, IBC-KIDv=KeyGen(msk, GSP, IDV).

In an embodiment of the fourth aspect of the disclosure, the method further comprises each of the level-(n−2) first processing systems to: receive a request for an IBC private key from one of the second and third processing systems, the request comprising an ID of the second or third processing system; establish a secured communication channel with respective second or third processing system; generate a level-(n−1) IBC private key, IBC-KID3P,n−1; and transmit the level-(n−1) IBC private key, IBC-KID3P,n−1, to respective second or third processing system via the secured communication channel.

A fifth aspect of the disclosure relates to a vehicle communication access framework comprising a first device residing in a vehicle, a first processing system operated by a first trusted third party, a second processing system operated by a second trusted third party, a third processing system operated by an original equipment manufacturer (OEM) of the vehicle, and a fourth processing system operated by a third party provider. The communication accesses between the first device and the third processing system are based on Identity Based Cryptography (IBC) private keys generated by the second processing system, and communication accesses between the first device and fourth processing system are based on Identity Based Cryptography (IBC) private keys generated by the first processing system. The first and second processing system are configured to: execute a first setup algorithm to generate a master secret key (MSK) and generate global system parameters (GSP); receive a request for an IBC private key from the first device, the request comprising an ID of the first device, IDV; establish a secured communication channel with the first device; in response to establishing the secured communication channel with the first device, the first processing system is configured to: generate a first IBC private key, IBC-KTTP1_IDv; and transmit the first IBC private key, IBC-KTTP1_IDv, to the first device via the secured communication channel; in response to establishing the secured communication channel with the first device, the second processing system is configured to: generate a second IBC private key, IBC-KTTP2_IDv; and transmit the second IBC private key, IBC-KTTP2_IDv, to the first device via the secured communication channel.

In an embodiment of the fifth aspect of the disclosure, the step to establish the secured communication channel with the first device comprises the first processing system to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the fifth aspect of the disclosure, the step to generate the IBC private key IBC-KTPP1_IDV comprises the first processing system to: execute a KeyGen algorithm to compute the first IBC private key (IBC-KTTP1_IDv) corresponding to IDV where the inputs to the KeyGen algorithm include msk, GSP and IDV, and can be expressed in the following expression, IBC-KTTP1_IDv=KeyGen(msk, GSP, IDV).

In an embodiment of the fifth aspect of the disclosure, the framework further comprises the first processing system to: receive a request for an IBC private key from the fourth processing system, the request comprising an ID of the fourth processing system; establish a secured communication channel with the fourth processing system; generate the IBC private key IBC-KTPP1_ID3P; and transmit the IBC private key IBC-KTPP1_ID3P to the fourth processing system via the secured communication channel.

In an embodiment of the fifth aspect of the disclosure, the step to establish the secured communication channel with the first device comprises the second processing system to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; and compute MAC2 which is a Message Authentication Code with Cred and IDV as the input; and establish the secured communication channel via a symmetric key in response to MAC1=MAC2.

In an embodiment of the fifth aspect of the disclosure, the step to generate the IBC private key IBC-KTPP2_IDV comprises the second processing system to: execute a KeyGen algorithm to compute the second IBC private key (IBC-KTTP2_IDv) corresponding to IDV where the inputs to the KeyGen algorithm include msk, GSP and IDV, and can be expressed in the following expression, IBC-KTTP2_IDv=KeyGen(msk, GSP, IDV).

In an embodiment of the fifth aspect of the disclosure, the framework further comprises the second processing system to: receive a request for an IBC private key from the third processing system, the request comprising an ID of the third processing system; establish a secured communication channel with the third processing system; generate the IBC private key IBC-KTPP2_ID3P; and transmit the IBC private key IBC-KTPP2_ID3P to the third processing system via the secured communication channel.

A sixth aspect of the disclosure relates to a method specifically for a vehicle communication access framework comprising: a first device residing in a vehicle, a first processing system operated by a first trusted third party, a second processing system operated by a second trusted third party, a third processing system operated by an original equipment manufacturer (OEM) of the vehicle, and a fourth processing system operated by a third party provider. The communication accesses between the first device and the third processing system are based on Identity Based Cryptography (IBC) private keys generated by the second processing system, and communication accesses between the first device and fourth processing system are based on Identity Based Cryptography (IBC) private keys generated by the first processing system. The method comprises the first and second processing system to: execute a first setup algorithm to generate a master secret key (MSK) and generate global system parameters (GSP); receive a request for an IBC private key from the first device, the request comprising an ID of the first device, IDV; establish a secured communication channel with the first device; in response to establishing the secured communication channel with the first device, the method comprises the first processing system to: generate a first IBC private key, IBC-KTTP1_IDv; and transmit the first IBC private key, IBC-KTTP1_IDv, to the first device via the secured communication channel; in response to establishing the secured communication channel with the first device, the method comprises the second processing system to: generate a second IBC private key, IBC-KTTP2_IDv; and transmit the second IBC private key, IBC-KTTP2_IDv, to the first device via the secured communication channel.

In an embodiment of the sixth aspect of the disclosure, the step to establish the secured communication channel with the first device comprises the first processing system to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the sixth aspect of the disclosure, the step to generate the IBC private key IBC-KTPP1_IDV comprises the first processing system to: execute a KeyGen algorithm to compute the first IBC private key (IBC-KTTP1_IDv) corresponding to IDV where the inputs to the KeyGen algorithm include msk, GSP and IDV, and can be expressed in the following expression, IBC-KTTP1_IDv=KeyGen(msk, GSP, IDV).

In an embodiment of the sixth aspect of the disclosure, the method further comprises the first processing system to: receive a request for an IBC private key from the fourth processing system, the request comprising an ID of the fourth processing system; establish a secured communication channel with the fourth processing system; generate the IBC private key IBC-KTPP1_ID3P; and transmit the IBC private key IBC-KTPP1_ID3P to the fourth processing system via the secured communication channel.

In an embodiment of the sixth aspect of the disclosure, the step to establish the secured communication channel with the first device comprises the second processing system to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; and compute MAC2 which is a Message Authentication Code with Cred and IDV as the input; and establish the secured communication channel via a symmetric key in response to MAC1=MAC2.

In an embodiment of the sixth aspect of the disclosure, the credential comprises information or details that are known only to the car owner and the trusted third party. Further, the credential is provided by the first processing system to the first device when the car owner registers the car at an office of the trusted third party.

In an embodiment of the sixth aspect of the disclosure, the step to generate the IBC private key IBC-KTPP2_IDV comprises the second processing system to: execute a KeyGen algorithm to compute the second IBC private key (IBC-KTTP2_IDv) corresponding to IDV where the inputs to the KeyGen algorithm include msk, GSP and IDV, and can be expressed in the following expression, IBC-KTTP2_IDv=KeyGen(msk, GSP, IDV).

In an embodiment of the sixth aspect of the disclosure, the method further comprises the second processing system to: receive a request for an IBC private key from the third processing system, the request comprising an ID of the third processing system; establish a secured communication channel with the third processing system; generate the IBC private key IBC-KTPP2_ID3P; and transmit the IBC private key IBC-KTPP2_ID3P to the third processing system via the secured communication channel.

A seventh aspect of the disclosure relates to a vehicle communication access framework comprising: a mobile device of a vehicle owner, a first device residing in the vehicle, a first processing system operated by a trusted third party, a second processing system operated by an original equipment manufacturer (OEM) of the vehicle, and a third processing system operated by a third party provider. The communication accesses among the first device, second processing system and third processing system are based on Identity Based Cryptography (IBC) private keys generated by the first processing system to respective first device, second processing system and third processing system. The first processing system is configured to: execute a setup algorithm to generate master secret key (MSK) and generate global system parameters (GSP); receive a request for a private key from the mobile device, the request comprising an ID of the first device, IDV; establish a secured communication channel with the mobile device; generate the private key, IBC-KIDv; transmit the private key, IBC-KIDv, to the mobile device via the secured communication channel and the mobile device is configured to: establish a short range communication channel with the first device; transmit the private key, IBC-KIDv, to the first device; and delete the private key, IBC-KIDv.

In an embodiment of the seventh aspect of the disclosure, the step to establish the secured communication channel with the mobile device comprises the first processing system to: generate and transmit the secured communication channel request; receive an authentication response from the third device, the authentication response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication via a symmetric key channel in response to MAC1=MAC2.

In an embodiment of the seventh aspect of the disclosure, the step to generate the private key IBC-KIDV comprises the first processing system to: execute a KeyGen algorithm to compute a private key (IBC-KIDv) corresponding to IDV where the inputs to the KeyGen algorithm include msk, GSP and IDV, and can be expressed in the following expression, IBC-KIDv=KeyGen(msk, GSP, IDV).

In an embodiment of the seventh aspect of the disclosure, the framework further comprises the first processing system to: receive a request for a private key from one of the second and third processing systems, the request comprising an ID of the second or third processing system; establish a secured communication channel with respective second or third processing system; generate the private key, IBC-KID3P;

and transmit the private key, IBC-KID3P, to respective second or third processing system via the secured communication channel.

An eight aspect of the disclosure relates to a processing system operated by a trusted third party for a communication access framework comprising a first device residing in a vehicle. The processing system comprises a processor, a storage medium and instructions stored on the storage medium and executable by the processor to: execute a setup algorithm to generate a master secret key (MSK) and generate global system parameters (GSP); receive a request for an IBC private key from the first device, the request comprising an ID of the first device, IDV; establish a secured communication channel with the first device; generate an IBC private key, IBC-KIDv; and transmit the IBC private key, IBC-KIDv, to the first device via the secured communication channel.

In an embodiment of the eight aspect of the disclosure, the instruction to establish the secured communication channel with the first device comprises the instructions to: generate and transmit a secured communication channel request; receive a secured communication channel response from the first device, the secured communication channel response comprising MAC1 which is a Message Authentication Code (MAC) with Cred and IDV as the input with the following expression, MAC1=MAC(Cred, IDV), where Cred is a credential previously provided by the first processing system to the first device; retrieve Cred associated to the IDV; compute MAC2 which is a Message Authentication Code with Cred and IDV as the input; and establish the secured communication channel via a symmetric key in response to MAC1=MAC2.

In an embodiment of the eight aspect of the disclosure, the instruction to generate the IBC private key IBC-KIDV further comprises instruction to: execute a KeyGen algorithm to compute the IBC private key (IBC-KIDv) corresponding to IDV where the inputs to the KeyGen algorithm include msk, GSP and IDV, and can be expressed in the following expression, IBC-KIDv=KeyGen(msk, GSP, IDV).

In an embodiment of the eight aspect of the disclosure, the processing system further comprises instructions to: receive a request for an IBC private key from one of the second and third processing systems, the request comprising an ID of the first or second processing system; establish a secured communication channel with respective second or third processing system; generate the IBC private key IBC-KID3P; and transmit the IBC private key IBC-KID3P to respective second or third processing system via the secured communication channel.

BRIEF DESCRIPTION OF THE DRAWINGS

The above advantages and features in accordance with this application are described in the following detailed description and are shown in the following drawings.

DETAILED DESCRIPTION

Figure 1:
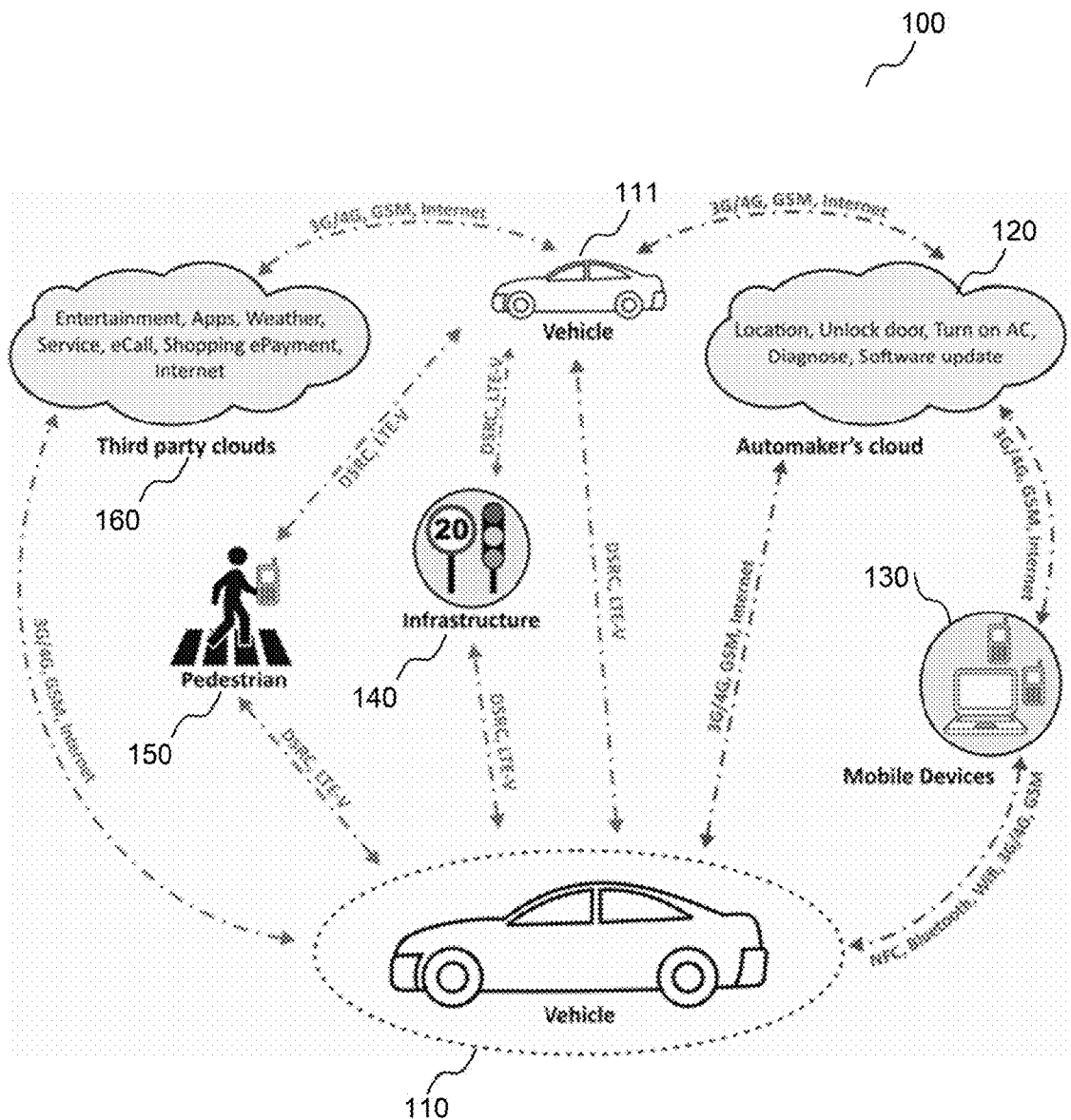
FIG. 1 illustrates an architecture of a vehicle in communication with external systems in accordance with current communication framework.

This disclosure relates to a vehicle communication access framework. Particularly, this disclosure relates to a method and system for generating and distributing IBC keys to vehicles and other entities such that the vehicles are able to communicate with other entities.

The vehicle communication access framework aims to overcome the complexity of using certificate based PKC in V2X and provide an efficient solution. In Identity Based Cryptography (IBC), an entity only needs to know other entity's ID information to establish a secure communication channel with other entity. No certificates are required to verify the authenticity of ID. Therefore, IBC removes complex PKI or certificate management system. There is no certificate transmission and verification ultimately reducing the cost of using certificate based PKC. IBC provides a reasonable balance between security and usability where authentication or decryption keys can be derived from corresponding ID. For outside-vehicle communication, IBC provides a speedy and efficient security.

Briefly, IBC is a public key cryptography where public key corresponds to an entity's identity (ID) information such as email address, phone number etc. Corresponding private key is generated by a PKG (Private Key Generator), a TTP There is no certificate required to validate the authenticity of the public key, i.e., ID. Hence, this works in favour since public keys/certificates are no longer required to be establish communication between two entities.

Broadly, the proposed vehicle communication access framework comprises the following parts:

1. IBC for outside vehicle communication to replace PKI: IBC is proposed for secured outside vehicle communication to replace the complex and costly PKI system.

2. Partitioned communication architecture: The outside-vehicle communication is divided into categories based on the nature of communication and the entities involved in communication. The communication architecture is first divided into two categories namely; closed environment communication and open environment communication. Open environment communication is further distinguished as public services and third party services. Further categories may be implemented without departing from the disclosure.

3. IBC in outside-vehicle communication: IBC is proposed for both closed environment communication and open environment communication. However, public services inside open environment may use IBC and/or PKI, and third party services may use their own solutions. Hence, this allows some flexibility for third party services that insist on using current PKI system.

IBC Setup for Outside-Vehicle Communication

The IBC setup for outside-vehicle communication has two main aspects to deal with: PKG Setup for outside vehicle communication and IBC Key Distribution to vehicle.

The PKG is a trusted third party for generating private keys for vehicles. Each vehicle communication access framework includes at least one PKG. The PKG runs a Setup algorithm to generate a master secret key 'msk' and computes global system parameters 'GSP' including a master public key 'mpk'. The GSP contains the parameters that are relevant to the IBC such as encryption and decryption schemes used for encrypting and decrypting messages. The PKG Setup for outside vehicle communication mainly answers the questions as to who can be the PKG and the number of PKGs to be implemented in the outside-vehicle communication access framework.

Figure 2:
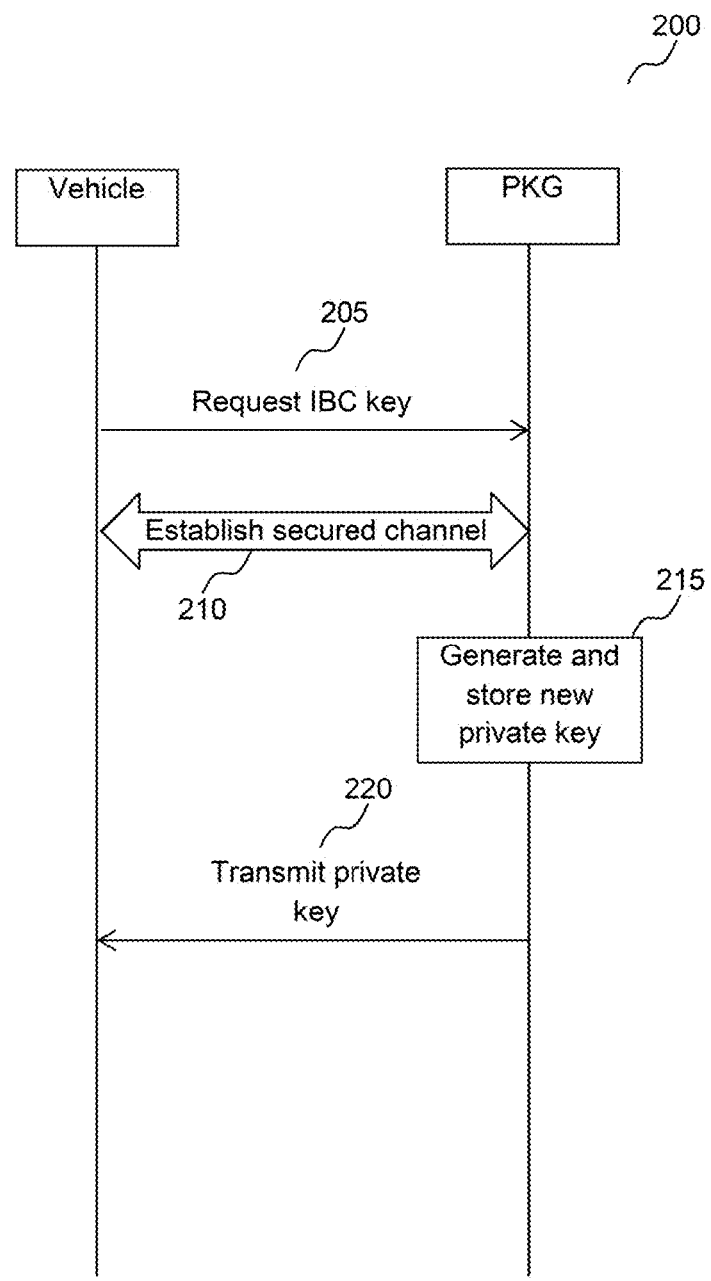
FIG. 2 illustrates a timing diagram of a process showing the general steps of key distribution performed between a vehicle and a PKG in accordance with an embodiment of this disclosure.
Figure 3:
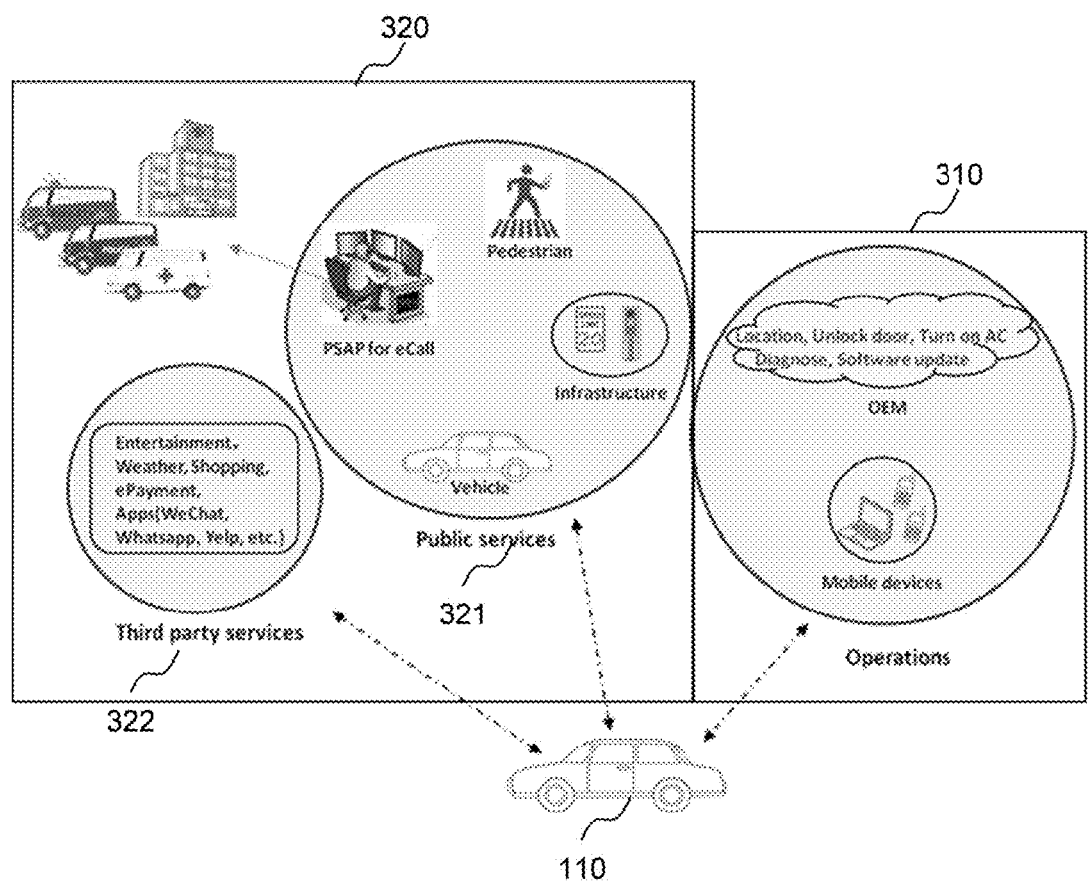
FIG. 3 illustrates partitioning outside-vehicle communication into open and closed environments in accordance with an embodiment of this disclosure.

In IBC Key Distribution, the PKG runs KeyGen algorithm using ID (IDV) of vehicle, its own msk & GSP and generates private key 'IBC-K' corresponding to IDV for vehicle. The PKG then delivers IBC-K to vehicle through a secure channel. FIG. 2 illustrates a timing diagram of a process 200 showing the general steps of IBC key distribution performed between a vehicle and a PKG. Process 200 begins with step 205 with an IBC Key Request. Particularly, a vehicle sends an IBC key request to PKG using its identity information IDV (vehicle IDV may be its vehicle identification number VIN or any other information to identify the vehicle or vehicle owner).

In step 210, the PKG would initiate a process to establish a secured communication channel. This is necessary to ensure that the requester has the credential to receive a private key and also allow the PKG to deliver private key to the vehicle thereafter in a secured manner. One method of establishing a secured communication channel between the PKG and the vehicle is by using message authentication code (MAC) for authentication and issuing a session key if the authentication between the two entities is successful. This only illustrates one possible method of establishing a secured communication channel. One skilled in the art will recognise that other method of establishing a secured communication channel between two entities may be implemented without departing from the disclosure. Further details will be described below.

In step 215, in response to successful establishing of the secured communication channel, the PKG runs a KeyGen algorithm to compute IBC private key corresponding to IDv. The inputs to the KeyGen algorithm include msk, GSP and IDv, and can be expressed in the following expression, IBC-$K_{ID_v}$=KeyGen(msk, GSP, IDv).

In step 220, the PKG transmits the IBC private key (IBC-KIDv) to the vehicle via the secured communication channel established in step 210. Particularly, assuming the secured communication channel is established using the example as illustrated above, the IBC private key (IBC-KIDv) would be encrypted using the session key IBC Key Distribution for outside vehicle communication mainly provides the details about how to securely distribute private key(s) to vehicle for communication in both closed and open environments. In other words, it deals with bootstrapping secure outside vehicle communication. Vehicle may directly obtain private IBC key from PKG. Alternatively, the vehicle may obtain private key from the PKG via a mobile device.

Once IBC private key is distributed to the vehicle, vehicle can store this key securely, e.g., in a secure hardware. After obtaining the IBC private key, vehicle can use it to protect outside communication using the corresponding IBC cryptographic primitive which could be IBS (Identity Based Signature) for authentication, IBE (Identity Based Encryption) for encryption or AIBE (Authenticated Identity Based Encryption) for both authentication and encryption. The managing of the key is beyond the scope of this disclosure. Further, the use the IBC private key, IBC-K, is application specific, and is also beyond the scope of this disclosure.

This embodiment presents the technical details of the above processes which aim to replace the complex PKI system with IBC for outside-vehicle communication.

The outside-vehicle communication is categorized into two categories based on the nature of communication and the entities involved in communication. The two categories are Closed environment 310 and Open environment 320. Closed environment 310 relates to communications pertaining to operations of the car. This communication typically involves communications among vehicle 110, owner's mobile device and original equipment manufacturer (OEM) such as automaker's cloud. Open environment 320 relates to communications pertaining to services other than operations of the car. Essentially, Open environment 320 involves communications between the cars and entities that provide services that are not related to operations of the car. Open environment 320 may be further divided into two categories; public services 321 (such as public safety answering point (PSAP), collision avoidance system, traffic management services etc.,) and third party services 322 (entertainment, music and video downloads, eShopping, third party apps like Facebook etc.). One skilled in the art will recognise that each of the open and closed environments may be divided to other number of categories without departing from the disclosure.

Communication in closed environment 310 is usually operation related communication among vehicle, automaker's cloud and owner's mobile devices, and without the involvement of other entities. Hence, closed environment is open for proprietary solutions and IBC is an ideal choice to avoid complex PKI. Public services 321 communication can implement IBC. However, they may also use IBC and/or PKI. Third party services 322 (e.g., Whatsapp, Yelp, Facebook, Twitter, eShopping, Google Now, etc.), on the other hand, are not mainly for vehicles and they may use their own solutions based on symmetric key, PKI or IBC.

Figure 4:
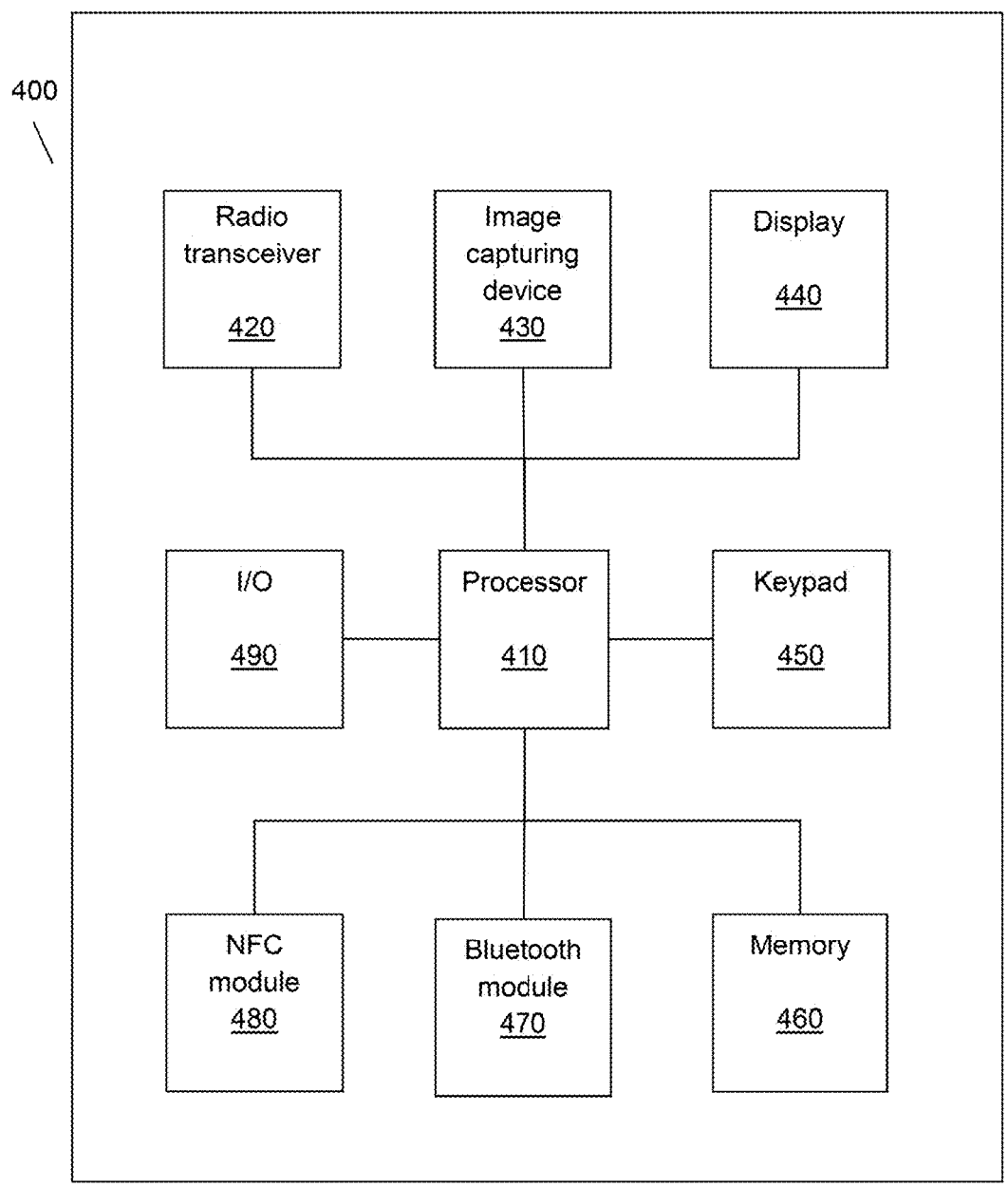
FIG. 4 illustrates an example of a processing system in a device residing in the car, mobile devices of car owners, or computing system executing as a PKG that perform processes in accordance with an embodiment of this disclosure.

FIG. 4 illustrates an example of a processing system 400 or a virtual machine running on the processing system 400 of a device residing in the car 110 or the mobile devices of the car owner or a computing system executing as a PKG. Particularly, processing system 400 represents the processing systems in the processing unit of the device residing in the car or the mobile devices of the car owner or a computing system executing as a PKG that execute instructions to perform the processes described below in accordance with embodiments of this disclosure. One skilled in the art will recognize that the instructions may be stored and/or performed as hardware, firmware, or software without departing from this application. Further, one skilled in the art will recognize that the exact configuration of each processing system may be different and the exact configuration of the processing system executing processes in accordance with this application may vary and processing system 400 shown in FIG. 4 is provided by way of example only.

Processing system 400 includes a processor 410, a radio transceiver 420, an image capturing device 430, a display 440, a keypad 450, a memory 460, a Bluetooth module 470, a Near Field Communication (NFC) module 480, and an I/O device 490.

The radio transceiver 420, image capturing device 430, display 440, keypad 450, memory 460, Bluetooth module 470, NFC module 480, I/O device 490 and any number of other peripheral devices connect to processor 410 to exchange data with processor 410 for use in applications being executed by processor 410.

The radio transceiver 420 is connected to an antenna which is configured to transmit outgoing voice and data signals and receive incoming voice and data signals over a radio communication channel. The radio communication channel can be a digital radio communication channel such as a WiFi, Bluetooth, RFID, NFC, DSRC, WiMax, CDMA, 3G/4G (or a future variant of cellular communication), GSM, or any other future wireless communication interface.

The image capturing device 430 is any device capable of capturing still and/or moving images such as complementary metal-oxide semiconductor (CMOS) or charge-coupled sensor (CCD) type cameras. The display 440 receives display data from processor 410 and display images on a screen for a user to see. The display 440 may be a liquid crystal display (LCD) or organic light-emitting diode (OLED) display. The keypad 450 receives user input and transmits the input to processor 410. In some embodiments, the display 440 may be a touch sensitive surface that functions as a keypad to receive user input.

The memory 460 is a device that transmits and receives data to and from processor 410 for storing data to a memory. The IBC key obtained from the PKG via a secure channel is stored in secured memory which may be a part of the memory 460 or provided as a separate memory. The Bluetooth module 470 is a module that allows processing system 400 to establish communication with another similar device based on Bluetooth technology standard. The NFC module 480 is a module that allows processing unit 410 to establish radio communication with another similar device by touching them together or by bringing the devices within a close proximity.

Other peripheral devices that may be connected to processor 410 include a Global Positioning System (GPS) and other positioning transceivers.

The processor 410 is a processor, microprocessor, or any combination of processors and microprocessors that execute instructions to perform the processes in accordance with the present disclosure. The processor has the capability to execute various application programs that are stored in the memory 460. These application programs can receive inputs from the user via the display 440 having a touch sensitive surface or directly from a keypad 450. Some application programs stored in the memory 460 that can be performed by the processor 410 are application programs developed for UNIX, Android, IOS, Windows, Blackberry or other platforms.

Figure 5:
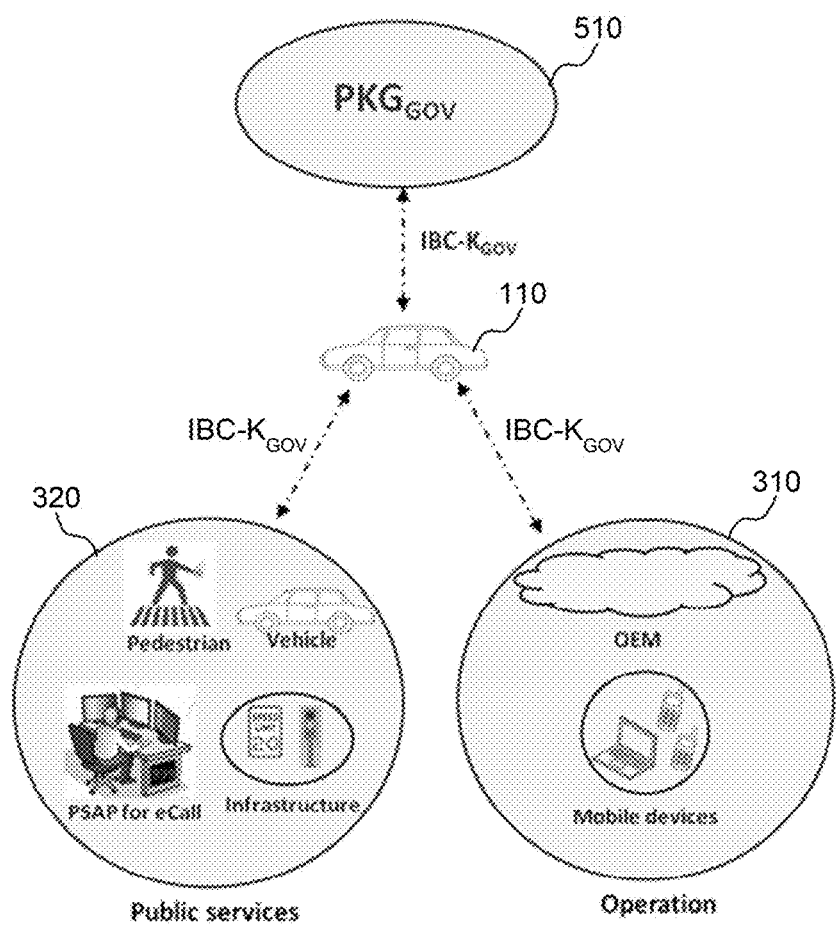
FIG. 5 illustrates a single PKG to compute private keys for both closed environment and open environment in accordance with an embodiment of this disclosure.

FIG. 5 illustrates a single PKG to compute private keys for both closed environment and open environment. On FIG. 5, a government or any other similar entity that is a trusted entity can deploy such PKG, i.e., PKGGOV 510, for both closed environment 310 and open environment 320 communications. In this case, the PKGGOV 510 will issue one set of IBC keys (IBC-KGOV) to vehicle 110. The PKGGOV 510 will issue IBC keys to the entities in the Open environment such as public services and Closed environment such as operation. Under this framework, the vehicle 110 would use its IBC keys (IBC-KGOV) to establish communication with both the Open environment and the Closed environment entities.

Figure 6:
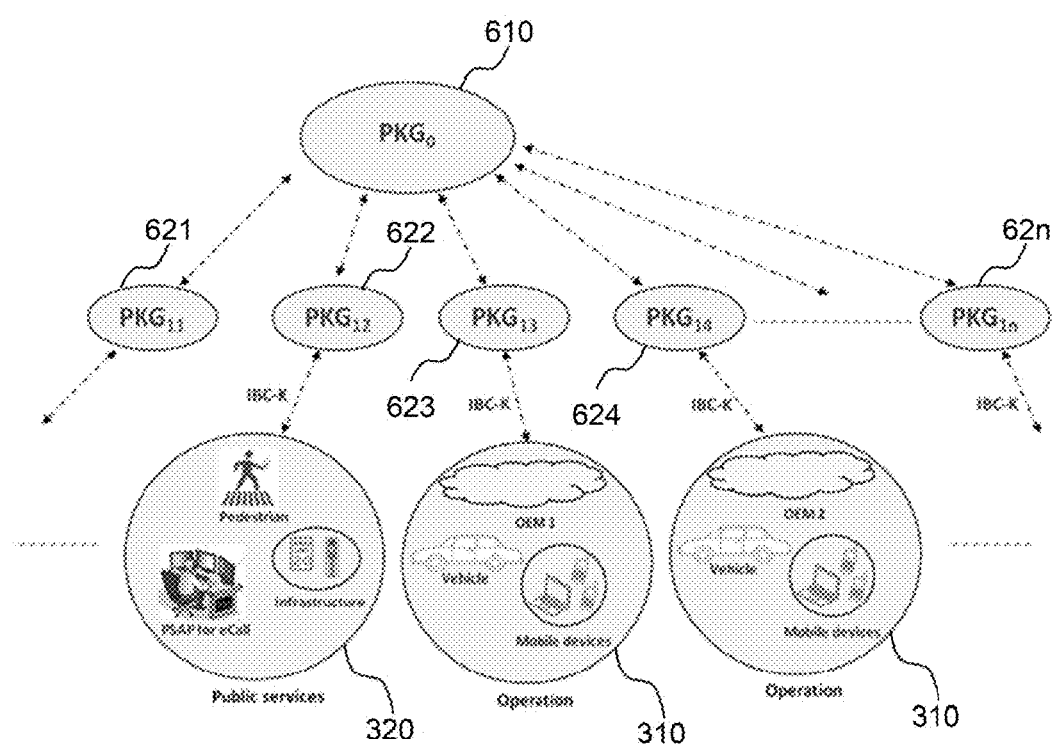
FIG. 6 illustrates a PKG in a hierarchical scheme in accordance with an embodiment of this disclosure.

In practice, the PKG may be hierarchical with one root PKG at level 0 610 and several intermediate level PKGs 621, 622, 623, 624 . . . 62n to distribute IBC keys to respective open and closed environments. Particularly, as shown in FIG. 6, intermediate level PKG 622 may be one intermediate level for one open environment, responsible to provide IBC keys for entities in the stated open environment; while intermediate levels PKGs 623 and 624 may be provided for closed environments for different OEMs. Each intermediate level PKG 621-62n will be associated to the root PKG 610. Although FIG. 6 only show one intermediate level for one open environment, one skilled in the art will recognise that other number of intermediate levels for open environment may be provided without departing from the disclosure. Similarly, other number of intermediate levels for closed environment may be provided without departing from the disclosure as well.

In a first embodiment, the PKG is a trusted third party which may be a government agency 510 to generate private keys for vehicle. A key setup and generation Application is installed on the PKG and only the trusted third party can initiate the key setup and generation Application. In the initialised stage, the PKG runs Setup algorithm of the key setup and generation Application to compute GSP and its own msk as (msk, GSP)=Setup( ).

After the setup algorithm, the PKG is ready to generate private keys. In brief, the PKG runs KeyGen algorithm to compute IBC-K private key(s) for vehicle and then securely distributes IBC-K private key(s) to vehicle. In other words, it bootstraps secure outside vehicle communication. To obtain IBC private key from PKG, we suppose vehicle has a device with long range connectivity to communicate with PKG. The device used to obtain IBC private key could be the embedded device inside connected vehicle or separated from vehicle. This means that the device with long range connectivity resides in the vehicle. If the device, residing in the vehicle, does not have long range connectivity, the device would at the very least include a short range connectivity to communicate with a mobile device of the owner. In this configuration, the device would be obtaining the IBC private keys from the PKG via the mobile device of the owner. Further details would be provided below.

FIG. 2 is used to illustrate how one set of IBC keys (IBC-KGOV) is obtained by the vehicle from a government agency deployed PKGGOV for both closed and open environment communication. In step 205, the device residing in the vehicle sends an IBC Key Request. Particularly, the device residing in the vehicle sends an IBC key request to PKG using its identity information IDV (vehicle IDV may be its vehicle identification number VIN or any other information to identify the vehicle or vehicle owner). Under this configuration, the device residing in the vehicle includes long range connectivity.

In step 210, the PKG would initiate a process to establish a secured communication channel. This is necessary to ensure that the requester has the credential to receive a private key and also allow the PKG to deliver private key to the vehicle thereafter in a secured manner. To establish a secured communication channel with PKGGOV, the vehicle needs some credentials shared with PKGGOV. At car purchase, car owner registers his car, e.g., with Department of Motor Vehicles (DMV) in USA or Land Transport Authority (LTA) in Singapore, using own information like NRIC, phone number, email address etc., to get license plates and legally operate on roads. The car owner then obtains PKGGOV details (e.g., how to access PKGGOV) and some secure credentials CredGOV (such as password). The credential may be provided to the car owner via SMS, email or in a sealed envelope from DMV/LTA or any other government department. One skilled in the art will recognise that the credentials are information or details that are known only to the car owner and the PKGGOV. Hence, other methods of obtaining the credential from PKGGOV such as having the car owner personally visiting the office maintaining the PKGGOV to obtain the credential without departing from the disclosure. The credential along with the NRIC, phone number, email address etc., being used to register the vehicle are stored in a data structure on the memory of the processing system of the PKGGOV. A secured communication channel is established between vehicle and PKGGOV using the CredGOV obtained at car registration time. This secured communication channel may be established using Message Authentication Code (MAC) for authentication. For example, upon receiving a secured communication channel request to establish a secured communication channel, the device residing in the vehicle generates MAC1 using the credential and its ID, MAC(CredGOV, IDV). The device residing in the vehicle transmits a secured communication channel response comprising MAC1 to the PKGGOV. In response to receiving the secured communication channel response from the vehicle, the PKGGOV retrieves the data structure and performs a lookup for the CredGOV associated to IDV and generates MAC2 using the CredGOV associated to IDV and the ID received in step 205. If MAC1=MAC2, a secured communication channel is established via a symmetric key. Particularly, a session key would be generated upon determining MAC1=MAC2, where the session key is used for encrypting and decrypting messages by both parties thereafter. This example illustrates one possible method of establishing a secured communication channel. One skilled in the art will recognise that other method of establishing a secured communication channel between two entities may be implemented without departing from the disclosure.

In step 215, in response to successful establishing of the secured communication channel, the PKGGOV runs the KeyGen algorithm to compute IBC private key (IBC-KIDv) corresponding to IDV. The inputs to the KeyGen algorithm include msk, GSP and IDV, and can be expressed in the following expression, IBC-KIDv=KeyGen(msk, GSP, IDV).

In step 220, the PKG transmits the IBC private key (IBC-IBC-KIDv) to the vehicle via the secured communication channel established in step 210. Particularly, assuming the secured communication channel is established using the example as illustrated above, the IBC private key (IBC-KIDv) would be encrypted using the session key.

The PKGGOV also generates private keys to the OEM and third party providers. The process to generate the IBC private keys, IBC-KID3P, to the OEM and third party providers may be similar to that for the vehicle which broadly involves the four steps as illustrated in FIG. 2. As OEM and third party providers are likely to operate under a business entity, it is likely that the OEM and third party providers would obtain the IBC private keys directly from the office maintaining the PKGGOV directly. One skilled in the art will recognise that other methods of obtaining the IBC private keys from the PKGGOV may be implemented for the OEM and third party providers without departing from the disclosure.

Figure 7:
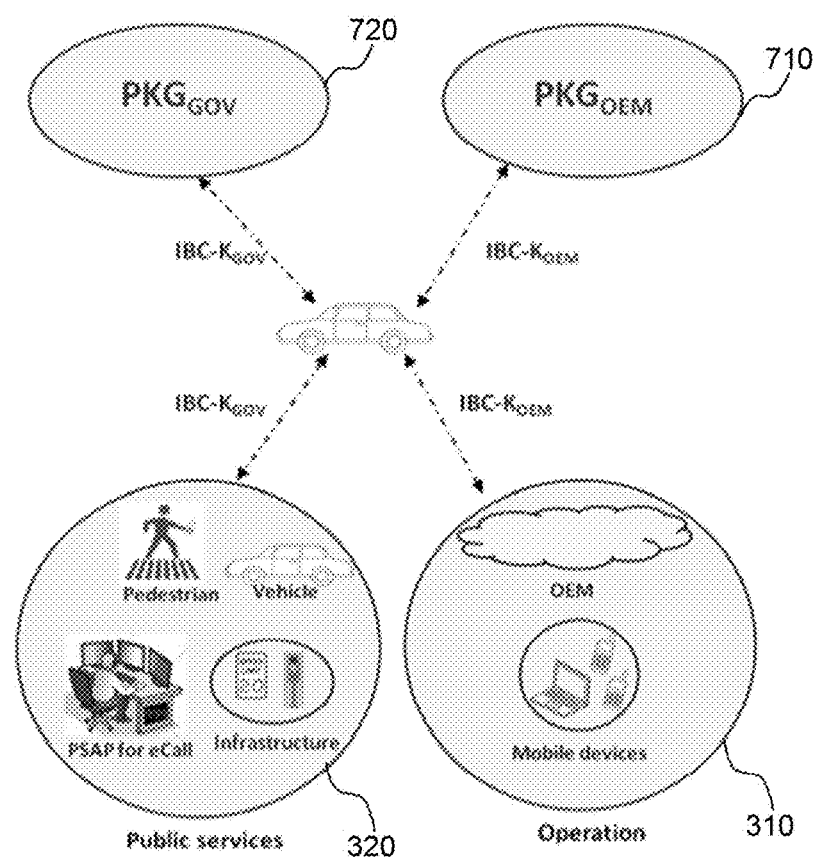
FIG. 7 illustrates separate PKGs to compute private keys for both closed environment and open environment in accordance with an embodiment of this disclosure.

FIG. 7 illustrates a second embodiment where each OEM deploys its own PKG apart from government deployed PKG. Each OEM (Original Equipment Manufacturer) may also deploy a separate PKG apart from government deployed PKG. In this framework, two PKGs will be setup; one PKGGOV by government agency for open environment communication and another PKGOEM by OEM for closed environment communication. As a result, two set of IBC keys will be maintained by a vehicle; one obtained from PKGOEM 710 for closed environment communication 310 and another obtained from PKGGOV 720 for open environment communication 320.

Under the second embodiment, two set of IBC keys will be distributed to vehicle, namely IBC-KOEM from PKGOEM and IBC-KGOV from PKGGOV. In this case, the vehicle can first obtain IBC-KOEM from PKGOEM and then obtain IBC-KGOV from PKGGOV. However, this order may be reversed without departing from the disclosure. A key setup and generation Application is installed on both PKGOEM and PKGGOV and only the PKGOEM and PKGGOV can initiate the key setup and generation Application.

In the initialised stage, both PKGOEM and PKGGOV runs Setup algorithm to compute GSP and its own msk as (msk, GSP)=Setup( ).

After the setup algorithm, both PKGOEM and PKGGOV are ready to generate private keys. Following are the details of how two sets of IBC keys (IBC-KGOV, IBC-KOEM) are obtained by the vehicle.

a) IBC-KOEM Obtained from PKGOEM

If OEM is the PKG, it can store IBC private key in vehicle at manufacturing time. Alternatively, vehicle obtains IBC private key IBC-KOEM from PKGOEM remotely. FIG. 2 is used to illustrate how one set of IBC keys (IBC-KOEM) is obtained by the vehicle remotely from the OEM deployed PKG, PKGOEM, for closed environment communication.

In step 205, the device residing in the vehicle sends an IBC Key Request. Particularly, the device residing in the vehicle sends an IBC key request to PKGOEM using its identity information IDV (vehicle IDV may be its vehicle identification number VIN or any other information to identify the vehicle or vehicle owner).

In step 210, the PKGOEM would initiate an authentication to establish a secured communication channel. This is necessary to ensure that the requester has the credential to receive a private key and also allow the PKG to deliver private key to the vehicle thereafter. To establish a secured communication channel with PKGOEM, the vehicle needs some credentials shared with PKGOEM. At car purchase time, owner registers his details such as phone number, email etc., with OEM/Dealer. The car owner then obtains PKGOEM details and some secure credentials CredOEM (such as password). The password may be provided to the car owner via SMS, email or in a sealed envelope from OEM or Dealer. Alternatively CredOEM can also be preinstalled in car by OEM at manufacturing time. A secured communication channel is established between vehicle and PKGOEM using the CredOEM. The credential along with the phone number, email address being used to register the vehicle are stored in a data structure on the memory of the processing system of the PKGOEM. This secured communication channel may be established using Message Authentication Code (MAC) for authentication. For example, upon receiving a request to establish a secured communication channel, the device residing in the vehicle generates MAC1 using the credential and its ID, MAC(CredOEM, IDV). The MAC1 is then transmitted to the PKGOEM. In response to receiving the MAC1 from the vehicle, the PKGOEM retrieves the data structure and performs a lookup for the CredOEM associated to IDV and generates MAC2 using the CredOEM associated to IDV and the ID received in step 205. If MAC1=MAC2, a secured communication channel is established via a symmetric key. Particularly, a session key would be generated upon determining MAC1=MAC2, where the session key is used for encrypting and decrypting messages by both parties thereafter. This example illustrates one possible method of establishing a secured communication channel. One skilled in the art will recognise that other method of establishing a secured communication channel between two entities may be implemented without departing from the disclosure.

In step 215, in response to successful establishing of the secured communication channel, the PKGOEM runs the KeyGen algorithm to compute private key (IBC-KOEM) corresponding to IDV. The inputs to the KeyGen algorithm include msk, GSP and IDV, and can be expressed in the following expression, IBC-KOEM=KeyGen(msk, GSP, IDV).

In step 220, the PKG transmits the private key (IBC-KOEM) to the vehicle via the secured channel established in step 210. Particularly, assuming the secured communication channel is established using the example as illustrated above, the private key (IBC-KOEM) would be encrypted using the session key.

The PKGOEM also generates private keys to the systems provided by OEM to allow the vehicle to communicate with the systems provided by the OEM. The process to generate the IBC private keys to the systems provided by the OEM may be similar to that generated for the vehicle which broadly involves the four steps as illustrated above. As the systems provided by the OEM are likely to operate under the same entity, it is likely that the OEM would obtain the IBC private keys directly from the department maintaining the PKGOEM. Hence, one skilled in the art will recognise that other methods of obtaining the IBC private keys from the PKGOEM may be implemented without departing from the disclosure.

b) IBC-KGOV Obtained from PKGGOV

Vehicle can obtain IBC key IBC-KGOV from PKGGOV following the same procedure as described in the first embodiment. Alternatively, the vehicle after obtaining the private key from the PKGOEM may establish a secured communication channel with PKGGOV using IBC-KOEM obtained in a) above. In this circumstance, the PKGOEM would need to obtain a private key from the PKGGOV.

In the above embodiments, if the device residing in the vehicle does not have long range connectivity to communicate with the PKG, the device residing in the vehicle may communicate with the PKG via a mobile device of the vehicle owner. In that case, the first 4 steps of IBC key distribution described with reference to FIG. 2 above are carried out between the car owner mobile device and PKG rather than between device residing in the vehicle and PKG. A device residing in the vehicle may include both long and short range communication means. Typically when the owner first gain access to the car, the long range communication means is unlikely enabled. For example, the owner may need to subscribe to a mobile network provider and install a subscriber identification module (SIM) to the device residing in the vehicle. Hence, the long range communication means is unlikely enabled when the owner first gain access to the car. Thus, the device residing in the vehicle has to communicate to external parties via the mobile device of the owner initially.

After the mobile device obtains the IBC private key, IBC-K, from the PKG (either PKGGOV or PKGOEM), two further steps would be provided in the following manner.

First, the mobile device uses a short range communication mean such as NFC to transfer IBC private key, IBC-K, to the vehicle. A short range communication is required so that the mobile device is within certain proximity from the vehicle to thwart attacks on wireless communication. The distance between the mobile device and the device residing in the vehicle is dependent on the type of short range communication mean. For example, if the short range communication mean is NFC, the distance from the mobile device to the device residing in the vehicle would likely be within 4 cm apart. Particularly, the mobile device establishes a communication with the device residing in the vehicle via NFC. Once the mobile device establishes the communication with the device residing in the vehicle via NFC, the mobile device transmits the IBC private key to the device residing in the vehicle.

After the IBC private key is stored in the secured memory of the device residing in the vehicle, the mobile device deletes the private key from its memory. Particularly, the device residing in the vehicle would transmit a message to the mobile device indicating that the private key has been stored in the secured memory. In response to receiving the message, the mobile device deletes the IBC private key from its memory.

In a third embodiment where hierarchical PKG is employed, the root PKG can be seen at level-0, which issues level-1 IBC private keys to PKGOEM and PKGGOV (intermediate level PKGs), while a level-1 IBC private key issues level-2 IBC private keys to systems (end users, e.g., vehicle and all other entities involved in outside vehicle communication) provided for open and closed environments. In practice, there may be more than 3 (0-2) levels involved. In particular, a hierarchical PKG scheme will consist of the following algorithms in the setup and key generation Application:

1. Setup algorithm: The root PKG runs Setup algorithm to compute GSP and its own msk as (msk, GSP)=Setup( ).

2. KeyGen algorithm: The (root and intermediate level) PKG runs KeyGen(IBC-KIDi,L, GSP, IDj,L+1)→IBC-KIDj,L+1, taking as input a level-L private key IBC-KIDi,L corresponding to an identity of the current level, IDi,L and an identity of the lower level, IDj,L+1, and outputting a lower level-(L+1) private key IBC-KIDj,L+1 corresponding to IDj,L+1. For root PKG, IBC-KIDi,L=msk.

As an example of a multi-levels hierarchical vehicle communication access framework comprising PKGs operated by trusted third party, devices residing in the vehicles, processing system operated by the OEM, and processing systems operated by third party providers. The PKGs operated by trusted third party are arranged between level-0 to level-(n−2) while the devices residing in the vehicles, processing system operated by the OEM, and processing systems operated by third party providers are arranged in level-(n−1). The root PKG (at level-0) will execute the setup algorithm to generate a master secret key (MSK) and compute global system parameters (GSP); and generate IBC private keys for next level PKGs (at level-1). From level-1 to level-(n−3), the PKGs in these levels will generate next level IBC private keys for next lower level PKGs (at level-(L+1)), where L refers to the current level. This is repeated until level-(n−2) PKGs obtains the IBC private keys, where n refers to the number of levels in the system. Since the PKGs are operated by a trusted third party, a secured communication channel may not be required to be established among the PKGs when generating and transmitting the IBC private keys to the lower level PKGs. Nevertheless, one skilled in the art will recognise that the connections between the upper and lower PKGs may not be secured and a secured communication channel may be required under such circumstances.

For level-(n−2) PKGs, the first 4 steps of IBC key distribution described with reference to FIG. 2 above are carried out between the device residing in the car and level-(n−2) PKGs. Alternatively, if the long range communication means has not been enabled, the device residing in the car can use its short range communication means such as NFC. In this case, the first 4 steps would be carried between the mobile device of the car owner and the PKGs. After the mobile device obtains the IBC private key, the mobile device would transmit the IBC private key to the device residing in the vehicle as described above.

FIG. 6 illustrates a 3 level system where level-0 and level-1 are PKGs and level-2 is the end users such as operation and public services.

The third embodiment presents a variation of the first and second embodiments where hierarchical PKG is employed. In practice, one PKG may not be sufficient to service a country with a large population. Hence, hierarchical PKG is typically implemented to spread the load. For example, level-0 PKG may be a country level PKG generating and issuing IBC private keys to the level-1 PKGs; level-1 PKGs may be a state level PKG generating and issuing IBC private keys to the level-2 PKGs; level-2 PKGs may be a city level PKG generating and issuing IBC private keys to the level-3 end users.

A fourth embodiment presents a variation of the first and second embodiments with the difference in the cryptographic setup for outside-vehicle communication. This embodiment applies when open environment entities use both IBC and PKI. For example, the implementation of IBC to securely communicate with vehicle whereas PKI to securely communicate with other entities in open environment. In that case, entities who also use PKI may compute/obtain their PKI based public and private keys and obtain a certificate from CA, in addition to obtaining private keys from PKG for communication with vehicle.

The fifth embodiment presents a variation of the fourth embodiment with the difference in the cryptographic setup for outside-vehicle communication. This embodiment applies when closed environment uses IBC whereas open environment uses PKI. In that case, vehicle may compute/obtain its PKI based public and private keys and obtain a certificate from CA for communication in open environment following the traditional steps set up by the CA, whereas it obtains private keys from PKG for communication in closed environment following the steps in previous embodiments 1 and 2 described above.

This disclosure is applicable to secure vehicle communication for setting up IBC in that environment and obtaining IBC private key for vehicle from PKG which will be used to protect outside-vehicle communication. After obtaining the IBC private key, vehicle can use it to protect outside communication using the corresponding IBC cryptographic primitive which could be IBS (Identity Based Signature) for authentication, IBE (Identity Based Encryption) for encryption or AIBE (Authenticated Identity Based Encryption) for both authentication and encryption. The managing of the key is beyond the scope of this disclosure. Further, the use the IBC-K is application specific, and is also beyond the scope of this disclosure.

The above is a description of embodiments of a method and system of a vehicle communication access framework, implementing an identity-based cryptography for generating and distributing IDs and keys between a device residing in a car, a trusted system operated by a trusted agency such as a government agency or an original equipment manufacturer to allow a car to communicate with systems in open and closed environments. It is foreseeable that those skilled in the art can and will design alternative method and system based on this disclosure that infringe upon this application as set forth in the following claims.

What is claimed is:

1. A vehicle communication access framework comprising:
    a first device residing in a vehicle, a first processing system operated by a trusted third party, a second processing system operated by an original equipment manufacturer (OEM) of the vehicle, and a third processing system operated by a third party provider;
    wherein communication accesses among the first device, the second processing system and the third processing system are based on Identity Based Cryptography (IBC) private keys generated by the first processing system to the first device, the second processing system and the third processing system;
    wherein the first processing system comprises a processor and a memory having processor-executable instructions stored thereon which is to be executed by the processor, and the instructions cause the processor to:
        execute a setup algorithm to generate a master secret key (MSK) and generate global system parameters (GSP);
        receive a request for a private key from the first device, the request comprising an identification (ID) of the first device ($ID_V$);
        establish a secured communication channel with the first device;
        generate an IBC private key (IBC-$K_{ID_v}$); and
        transmit the IBC-$K_{ID_v}$ to the first device via the secured communication channel,
    wherein the IBC-$K_{ID_v}$ is used for a closed environment communication that involves the OEM of the vehicle for operation related communications among the vehicle, OEM's cloud and mobile devices of an owner of the vehicle, and
    wherein the IBC-$K_{ID_v}$ is used for an open environment communication that involves the third party provider for services other than operations of the vehicle.

2. The vehicle communication access framework according to claim 1, wherein in establishing the secured communication channel with the first device, the processor is further configured to:
    generate and transmit a secured communication channel request;
    receive a secured communication channel response from the first device, the secured communication channel response comprising MAC1 which is a Message Authentication Code (MAC) with Cred and the $ID_V$ as input, wherein MAC1=MAC(Cred, $ID_V$), where the Cred is a credential previously provided by the first processing system to the first device;
    retrieve the Cred associated to the $ID_V$;
    compute MAC2 which is another MAC with Cred and $ID_V$ as input; and
    establish the secured communication channel via a symmetric key in response to a situation of MAC1=MAC2.

3. The vehicle communication access framework according to claim 1, wherein in generating the IBC-$K_{ID_V}$, the processor is further configured to:
    execute a KeyGen algorithm to compute the IBC-$K_{ID_v}$ corresponding to the $ID_V$, where inputs to the KeyGen algorithm include: the msk, the GSP and the $ID_V$, and wherein IBC-$K_{ID_v}$=KeyGen(msk, GSP, $ID_V$).

4. The vehicle communication access framework according to claim 1, wherein the processor is further configured to:

receive a request for an IBC private key from one of the second and third processing systems, the request comprising an ID of the first or second processing system;

establish a secured communication channel with the second or third processing system;

generate the IBC private key as IBC-$K_{ID_{3P}}$; and transmit the IBC-$K_{ID_{3P}}$ to the second or third processing system via the secured communication channel.

5. The vehicle communication access framework according to claim 1, wherein the trusted third party is one of a government agency or the OEM.

6. The vehicle communication access framework according to claim 1, further comprising a fourth processing system operated by another trusted third party, wherein communication accesses between the first device and the third processing system are based on IBC private keys generated by the fourth processing system.

7. A method applied for a vehicle communication access framework which comprises: a first device residing in a vehicle, a first processing system operated by a trusted third party, a second processing system operated by an original equipment manufacturer (OEM) of the vehicle, and a third processing system operated by a third party provider; wherein communication accesses among the first device, the second processing system and the third processing system are based on Identity Based Cryptography (IBC) private keys generated by the first processing system to the first device, the second processing system and the third processing system, the method comprising:

executing a setup algorithm to generate master secret key (MSK) and generating global system parameters (GSP);

receiving a request for a private key from the first device, the request comprising an identification (ID) of the first device ($ID_V$);

establishing a secured communication channel with the first device;

generating an IBC private key (IBC-$K_{ID_V}$); and transmitting the IBC-$K_{ID_V}$ to the first device via the secured communication channel, wherein the IBC-$K_{ID_V}$ is used for a closed environment communication that involves the OEM of the vehicle for operation related communications among the vehicle, OEM's cloud and mobile devices of an owner of the vehicle, and wherein the IBC-$K_{ID_V}$ is used for an open environment communication that involves the third party provider for services other than operations of the vehicle.

8. The method according to claim 7, wherein the establishing the secured communication channel with the first device further comprises:

generating and transmitting a secured communication channel request;

receiving a secured communication channel response from the first device, the secured communication channel response comprising MAC1 which is a Message Authentication Code (MAC) with Cred and the $ID_V$ as input, wherein MAC1=MAC(Cred, $ID_V$), where the Cred is a credential previously provided by the first processing system to the first device;

retrieving the Cred associated to the $ID_V$;

computing MAC2 which is another MAC with Cred and $ID_V$ as input; and establishing the secured communication channel via a symmetric key in response to a situation of MAC1=MAC2.

9. The method according to claim 8, wherein the credential comprises information that are known only to the vehicle owner and the trusted third party.

10. The method according to claim 9, wherein the credential is provided by the first processing system to the first device in response to the vehicle owner registering the vehicle at an office of the trusted third party.

11. The method according to claim 7, wherein the generating the IBC-$K_{ID_V}$ further comprises:

executing a KeyGen algorithm to compute the IBC-$K_{ID_V}$ corresponding to the $ID_V$, where inputs to the KeyGen algorithm include: the msk, the GSP and the $ID_V$, wherein IBC-$K_{ID_V}$=KeyGen(msk, GSP, $ID_V$).

12. The method according to claim 7, further comprising:

receiving a request for a private key from one of the second and third processing systems, the request comprising an ID of the first or second processing system;

establishing a secured communication channel with the second or third processing system;

generating the private key as IBC-$K_{ID_{3P}}$; and transmitting the IBC-$K_{ID_{3P}}$ to the second or third processing system via the secured communication channel.

13. The method according to claim 7, wherein the trusted third party is one of a government agency or the OEM.

14. The method according to claim 7, wherein the vehicle communication access framework further comprises: a fourth processing system operated by another trusted third party configured to generate another IBC private key for the first device residing in the vehicle, wherein communication accesses between the first device and the third processing system are based on the another IBC private keys generated by the fourth processing system.

15. An n-levels hierarchical vehicle communication access framework comprising:

a first device residing in a vehicle, a plurality of first processing systems operated by a trusted third party, a second processing system operated by an original equipment manufacturer (OEM) of the vehicle, and a third processing system operated by a third party provider;

wherein communication accesses among the first device, the second processing system and the third processing system are based on Identity Based Cryptography (IBC) private keys generated by one of the plurality of first processing systems to the first device, the second processing system and the third processing system, the plurality of first processing systems are arranged between level-0 to level-(n−2) in the n-levels hierarchical vehicle communication access framework and the first device, the second processing system and the third processing system are in the level-(n−1) in the n-levels hierarchical vehicle communication access framework, wherein n is a positive integer greater than or equal to 3;

wherein each of the first and second processing systems comprises a processor and a memory having processor-executable instructions stored thereon which is to be executed by the processor, and the instructions cause the processor of the level-0 first processing system:

execute a setup algorithm to generate a master secret key (MSK) and generate global system parameters (GSP);

each of the level-0 to level-(n−3) first processing systems is configured to:

receive a request for an IBC private key from a lower intermediate level first processing system, L+1, the request comprising an identification (ID) of the lower intermediate level first processing system (ID$_{j,L+1}$), wherein L is an integer greater than or equal to 0, and indicates the current level number;

generate a next level IBC private key (IBC-K$_{ID_{j,L+1}}$), in response to receiving the request; and transmit the IBC-K$_{ID_{j,L+1}}$, to the lower intermediate level first processing system;

wherein each of the level-(n−2) first processing systems is configured to:

receive a request for an IBC private key from the first device, the request comprising an ID of the first device (ID$_V$);

establish a secured communication channel with the first device;

generate a level-(n−1) IBC private key (IBC-K$_{ID_{v,n-1}}$); and transmit the IBC-K$_{ID_{v,n-1}}$, to the first device via the secured communication channel.

16. The n-levels hierarchical vehicle communication access framework according to claim 15, wherein in establishing the secured communication channel with the first device, each of the level-(n−2) first processing systems is configured to:

generate and transmit a secured communication channel request;

receive a secured communication channel response from the first device, the secured communication channel response comprising MAC1 which is a Message Authentication Code (MAC) with Cred and the ID$_V$ as input, wherein MAC1=MAC(Cred, ID$_V$), where the Cred is a credential previously provided by the first processing system to the first device;

retrieve the Cred associated to the ID$_V$;

compute MAC2 which is another MAC with Cred and ID$_V$ as input; and establish the secured communication channel via a symmetric key in response to a situation of MAC1=MAC2.

17. The n-levels hierarchical vehicle communication access framework according to claim 15, wherein in generating the IBC-K$_{ID_{v,n-1}}$, each of the level-(n−2) first processing systems is further configured to:

execute a KeyGen algorithm to compute the IBC-K$_{ID_v}$ corresponding to the ID$_V$ where inputs to the KeyGen algorithm include: the msk, the GSP and the ID$_V$, wherein IBC-K$_{ID_v}$=KeyGen(msk, GSP, ID$_V$).

18. The n-levels hierarchical vehicle communication access framework according to claim 15, wherein each of the level-(n−2) first processing systems is further configured to:

receive a request for an IBC private key from one of the second and third processing systems, the request comprising an ID of the first or second processing system;

establish a secured communication channel with the second or third processing system;

generate a level-(n−1) IBC private key as IBC-K$_{ID_{3P,n-1}}$; and transmit the IBC-K$_{ID_{3P,n-1}}$, to the second or third processing system via the secured communication channel.

19. A method specifically applied to an n-levels hierarchical vehicle communication access framework which comprises: a first device residing in a vehicle, a plurality of first processing systems operated by a trusted third party, a second processing system operated by an original equipment manufacturer (OEM) of the vehicle, and a third processing system operated by a third party provider; wherein communication accesses among the first device, the second processing system and the third processing system are based on Identity Based Cryptography (IBC) private keys generated by one of the plurality of first processing systems to the first device, the second processing system and the third processing system, the plurality of first processing systems are arranged between level-0 to level-(n−2) in the n-levels hierarchical vehicle communication access framework and the first device, the second processing system and the third processing system are in the level-(n−1) in the n-levels hierarchical vehicle communication access framework, wherein n is a positive integer greater than or equal to 3, the method comprises:

executing, by the level-0 first processing system, a setup algorithm to generate a master secret key (MSK) and generate global system parameters (GSP);

receiving, by each of the level-0 to level-(n−3) first processing systems, a request for an IBC private key from a lower intermediate level first processing system (L+1), the request comprising an identification (ID) of the lower intermediate level first processing system (ID$_{j,L+1}$), wherein L is an integer greater than or equal to 0, and indicates the current level number;

generating, by each of the level-0 to level-(n−3) first processing systems, a next level IBC private key (IBC-K$_{ID_{j,L+1}}$), in response to receiving the request; and transmitting, by each of the level-0 to level-(n−3) first processing systems, the IBC-K$_{ID_{j,L+1}}$ to the lower intermediate level first processing system;

receiving, by each of the level-(n−2) first processing systems, a request for an IBC private key from the first device, the request comprising an ID of the first device (ID$_V$);

establishing, by each of the level-(n−2) first processing systems, a secured communication channel with the first device;

generating, by each of the level-(n−2) first processing systems, a level-(n−1) IBC private key (IBC-K$_{ID_{v,n-1}}$); and transmitting, by each of the level-(n−2) first processing systems, the IBC-K$_{ID_{v,n-1}}$, to the first device via the secured communication channel.

20. The method according to claim 19, wherein the establishing the secured communication channel with the first device comprises:

generating and transmitting, by each of the level-(n−2) first processing systems, a secured communication channel request;

receiving, by each of the level-(n−2) first processing systems, a secured communication channel response from the first device, the secured communication channel response comprising MAC1 which is a Message Authentication Code (MAC) with Cred and the ID$_V$ as input, wherein MAC1=MAC(Cred, ID$_V$), where the Cred is a credential previously provided by the first processing system to the first device;

retrieving the Cred associated to the ID$_V$;

computing MAC2 which is another MAC with Cred and ID$_V$ as input; and establishing the secured communication channel via a symmetric key in response to a situation of MAC1=MAC2.

* * * * *

UNITED STATES PATENT AND TRADEMARK OFFICE
CERTIFICATE OF CORRECTION

PATENT NO. : 11,588,622 B2
APPLICATION NO. : 16/833022
DATED : February 21, 2023
INVENTOR(S) : Yasmin et al.

It is certified that error appears in the above-identified patent and that said Letters Patent is hereby corrected as shown below:

In the Claims

Claim 15: Column 24, Line 59: "system:" should read -- system to: --.

Signed and Sealed this
Sixth Day of June, 2023

Katherine Kelly Vidal
*Director of the United States Patent and Trademark Office*